United States Patent [19]

Witczak

[11] Patent Number: 5,029,672
[45] Date of Patent: Jul. 9, 1991

[54] LUBRICATING SYSTEM FOR PRINTING, DUPLICATING AND LIKE MACHINES

[75] Inventor: Stanley Witczak, Chicago, Ill.

[73] Assignee: AM International, Chicago, Ill.

[21] Appl. No.: 421,139

[22] Filed: Oct. 13, 1989

[51] Int. Cl.$^5$ .............................................. 16N 27/00
[52] U.S. Cl. ...................................... 184/7.4; 184/81
[58] Field of Search ............ 184/6.1, 6.4, 7.4, 81, 184/39, 39.1, 41, 42, 103.1

[56] References Cited

U.S. PATENT DOCUMENTS

| | | | |
|---|---|---|---|
| 1,811,343 | 6/1931 | Bancroft | 184/6.4 |
| 1,885,500 | 11/1932 | Williamson | 184/81 |
| 1,953,564 | 4/1934 | Neimetz | 184/7.4 |
| 2,499,571 | 3/1950 | Davis | 184/7.4 |
| 2,612,237 | 9/1952 | Tear | 184/7.4 |
| 2,688,382 | 9/1954 | Georgeff | 184/6.4 |
| 3,078,960 | 2/1963 | Minton | 184/81 |
| 3,618,709 | 11/1971 | Boelkins | 184/6.4 |
| 4,392,431 | 7/1983 | Wieland | 101/365 |
| 4,896,596 | 1/1990 | Helinski | 101/93.48 |

Primary Examiner—Ira S. Lazarus
Assistant Examiner—Alan B. Coriaso
Attorney, Agent, or Firm—Wood, Phillips, Mason, Recktenwald & Vansanten

[57] ABSTRACT

A system for lubricating a plurality of lubricating points in a printing, duplicating or like machine is disclosed. A main reservoir is provided for containing lubricating fluid. A distributor is located on the machine above the lubricating points and has a plurality of metering reservoirs, with an overflow passage from each metering reservoir, and a gravity feed line from each metering reservoir to a receptive one of the lubricating points. A pump is provided for pumping lubricating fluid from the main reservoir through a supply line to the distributor for filling the metering reservoirs and with excess fluid overflowing the metering reservoirs through the overflow passages. The pump is periodically actuated and deactuated to periodically fill the metering reservoirs.

19 Claims, 2 Drawing Sheets

LUBRICATING SYSTEM FOR PRINTING, DUPLICATING AND LIKE MACHINES

FIELD OF THE INVENTION

This invention generally relates to printing or duplicating machines and, more particularly, to a system for lubricating a plurality of lubricating points in such a machine.

BACKGROUND OF THE INVENTION

Printing machines, such as rotary offset lithographic duplicating machines, rotary printing presses, or the like, normally include a number of cylinders and/or rollers such as impression cylinders, master cylinders, blanket cylinders, form rollers, ductor rollers, distributor rollers, regulator rollers, transfer rollers, oscillating rollers, and the like. An ink fountain, including a fountain roller, is disposed generally at the rear of the machine for feeding ink to the various rollers of the printing couple which transfers images to copy sheets. In such printing machines as rotary offset lithographic duplicating machines, a moisture fountain, including a fountain roller, also is disposed adjacent the printing couple for feeding moisture to the printing couple. In addition, there are other mechanisms, such as the various paper feeding mechanisms, which are rotatably or otherwise movably mounted on the machine framework.

In other words, such machines are substantially entirely comprised of relatively movable or rotatable mechanical components except, of course, for the various timing and operational controls of the machine. There are many bearings, bushings and the like which require periodic lubrication. The lubricating points are at many different locations on the machine, including at different elevations. Originally, periodic lubrication of such machines was done by hand. It immediately can be understood that manual lubrication was extremely tedious. In addition, the machine had to be shut down for safety purposes and in order to gain access to at least some of the lubricating points when the periodic lubrication was done manually by an operator.

Heretofore, there generally have been two general systems for eliminating manual lubrication processes, namely (a) gravity lubrication systems and (b) powered lubrication systems. A gravity system is very simple and inexpensive and generally comprises an elevated reservoir of lubricating fluid with a plurality of gravity feed lines running from the reservoir to a plurality of lubricating points on the machine. There is little or no control over such gravity systems, particularly in the amount of lubrication to be fed to the various lubricating points. One feed line may be "slower" than the other, and different elevations to the different lubricating points create different pressure heads. A frequent result with gravity feed systems is that one or more lubricating points will get extremely "dry" and damage the respective lubricated components and/or one or more lubricating points will have excessive lubrication which contaminates the machine. Another problem with gravity feed systems is that in many machines there is insufficient room at the top of the machine to accommodate the lubricating fluid reservoir, or else the reservoir simply was placed above the machine creating very undesirable aesthetic problems.

Powered systems best can be described generally as some form of powered mechanism that "squirts" lubrication at the various lubricating points. Such systems can be highly controlled both in volume and timing. However, such systems are very expensive, require many components which must be interspersed in already crowded spaces, and the expense simply is cost prohibitive for most print shop type machines or presses. In addition, it is more desirable to lubricate the various components slowly or gradually, as with "droplets" of lubricating fluid as in a gravity feed system, which is difficult to accomplish with powered systems.

This invention is directed to solving the above problems and/or dilemmas of prior lubricating systems by providing a unique system which incorporates the advantages of both a gravity feed system and a powered system but eliminates the disadvantages thereof.

SUMMARY OF THE INVENTION

An object, therefore, of the invention is to provide a new and improved system for lubricating a plurality of lubricating points in a printing, duplicating and like machine.

Generally, the system includes a main reservoir of lubricating fluid. The reservoir may be placed beneath the operative components of the machine where there usually is ample vacant space. At least one distributor means is located above the respective lubricating points of the machine and has a plurality of metering reservoirs, overflow means from each metering reservoir and a gravity feed line from each metering reservoir to a respective one of the lubricating points. Pump means are provided for pumping lubricating fluid from the main reservoir through appropriate conduit means to the distributor means for filling the metering reservoirs and with excess fluid overflowing the metering reservoirs through the overflow means. Means are provided for periodically actuating and deactuating the pump means.

As illustrated herein, overflow conduit means are provided from the overflow means of the distributor means for feeding the overflowing fluid back to the main reservoir. This provides a completely closed circuit.

In addition, the distributor means include passage means to each metering reservoir in communication with the supply conduit means. The flow capabilities of the respective passage means are substantially equal, and the flow capabilities of all of the passage means combined is less than the flow capabilities of the supply conduit means to insure that all metering reservoirs receive an equal flow of lubricating flow. Preferably, the gravity feed lines from the distributor means to the respective lubricating points are sufficiently small in relation to the viscosity of the lubricating fluid as to deliver fluid to the lubricating points in droplets.

In most machines, a plurality of the distributor means are preferred and disposed at different locations of different elevations on the machine. To this end, separate supply conduit means are provided between the pump means and each distributor means. Check valves are provided respectively in each conduit means to prevent a more elevated distributor means from back feeding to a less elevated distributor means.

From the foregoing, it can be understood that the metering reservoirs provide precise control over the volume of lubricating fluid to be delivered to the various lubricating points on the machine. In addition, it is well known that pumps can be highly controlled, particularly in their timing. Consequently, periodic lubrication cycles can be achieved, such as after every given number of copy sheets have been run through the machine. All of this can be accomplished while the machine continues to run and without operator assistance.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
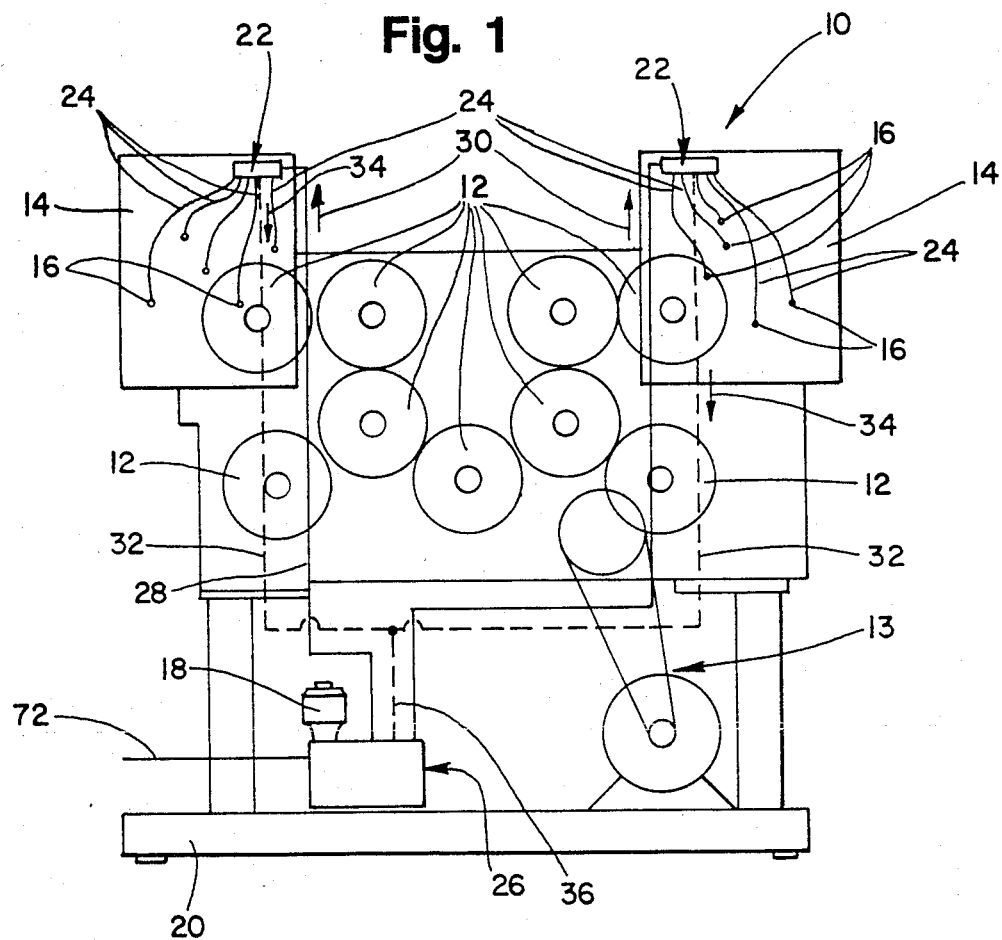
FIG. 1 is a schematic illustration of a printing or duplicating machine generally incorporating the concepts of the invention.

Referring to the drawings in greater detail, and first to FIG. 1, a printing or duplicating machine, generally designated 10, is shown very schematically simply to set an environment for the invention. The lubricating system of the invention is applicable for all kinds of printing and duplicating machines. The machine includes a number of rollers 12 which may comprise impression cylinders, master cylinders, blanket cylinders and the like, the number of which would depend upon the number of printing couples provided by the machine. Motor means, generally designated 13, are provided for rotating the various rollers, usually through appropriate gear trains. In addition, behind frame or cover components 14, are disposed a number of form rollers, ductor rollers, distributor rollers, regulator rollers, transfer rollers, oscillating rollers, and the like, all forming part of an ink feeding system and/or a moisture feeding system. The invention is shown for illustration purposes as providing lubricating fluid to a plurality of lubricating points 16 which may be the bearings or bushings for the various rollers of the ink and/or moisture systems. Of course, it should be understood that there are many other points on the machine to which lubricating fluid can and should be fed.

Still referring to FIG.1, the invention contemplates a main reservoir 18 located at the bottom of the machine above a base framework 20. In most such machines, the printing couples themselves, under industry standards, must be elevated from a floor for ease of operation and maintenance and for safety of the operator. Consequently, there usually is ample space beneath the working mechanisms to accommodate reservoir 18 and other components of the lubricating system. At least one, but normally a plurality of distributor means, generally designated 22, are located on the machine above reservoir 18 and above lubricating points 16. A gravity feed line 24 leads from one of the distributor means to each lubricating point 16.

Pump means, generally designated 26, are located on base framework 20 at the bottom of the machine for pumping lubricating fluid from main reservoir 18 through appropriate supply conduit means 28 to each distributor means 22, as indicated by arrows 30. Conduit means 28, therefore, provide the lubrication supply lines to the distributor means. Overflow lines 32, for purposes described hereinafter, run back from each distributor means 22, as indicated by arrows 34, to a common overflow line 36 which is in communication with main reservoir 18. Therefore, a completely closed, self-contained system is provided.

Figure 2:
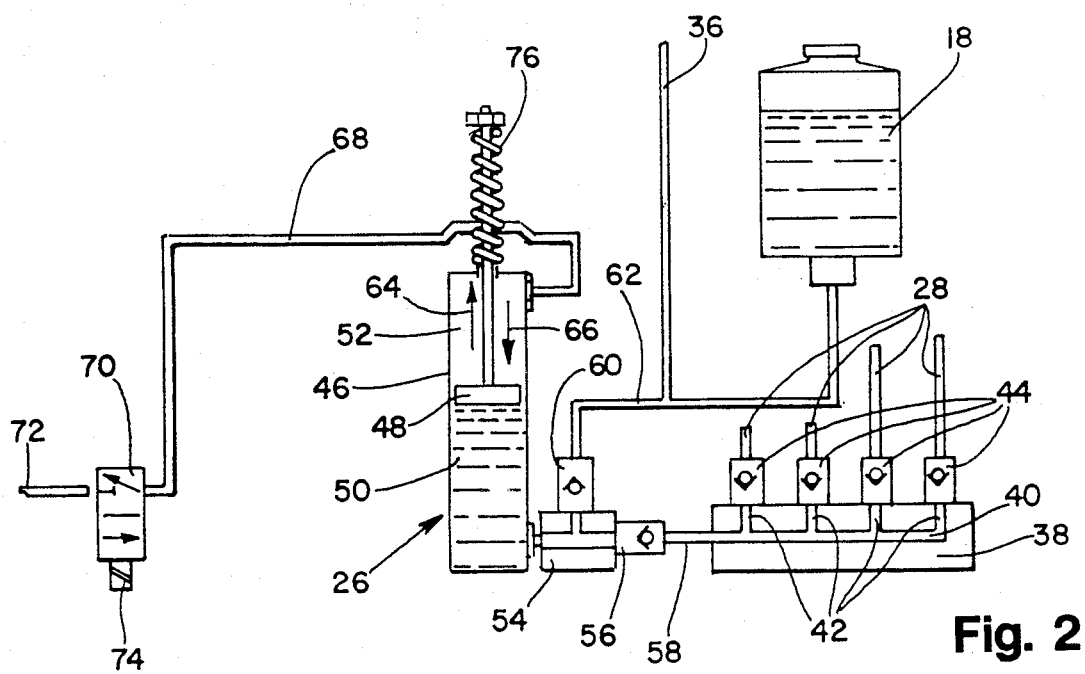
FIG. 2 is a schematic illustration of the pumping system of the invention.

FIG.2 schematically shows the pumping and supply components and associated controls. More particularly, main lubricating fluid reservoir 18 is shown in conjunction with common overflow line 36 and pump means 26 described in relation to FIG. 1. Four supply lines 28 also are shown leading from a manifold 38. Although only two distributor means 22 are shown in FIG. 1, and four supply lines 28 are shown in FIG. 2, this discrepancy in number is intentional to illustrate that various numbers of distributor means can be positioned about the machine. For instance, assuming that FIG. 1 is looking at one side of the machine, there also should be two more distributor means on the opposite side of the machine for lubricating points 16 which may represent bearing means at opposite ends of the various roller shafts.

Manifold 38 has an interior passage 40, with four branch passages 42 leading to the four supply lines. It should be noted that check valves 44 are provided in each supply line 28 and are provided because the various distributor means located about the machine most likely will be positioned at the most convenient locations, or where space allows, and most likely will be at different elevations. Consequently, the check valves prevent lubricating fluid from back feeding from a more elevated distributor means to a less elevated distributor means.

Pump means 26 includes a pump cylinder 46 and a pump piston 48 define a lubricating fluid side 50 on one side of the piston (below the piston as shown in the drawing) and an air side 52 of the piston (above the piston as shown in the drawing), within cylinder 46. Fluid side 50 communicates through a juncture box 54 to manifold 38 through a check valve 56 and a conduit 58, and to oil reservoir 18 and overflow line 36 through a check valve 60 and a line 62. Although overflow line 36 is shown communicating with line 62, the overflow line equally could flow directly to the reservoir and will be considered as such hereinafter. Consequently, when piston 48 is moved on an upstroke (as viewed in the drawings), as indicated by arrow 64, fluid is drawn from oil reservoir line 62 past check valve 60 into cylinder 46, but fluid cannot be drawn from manifold 38 and supply lines 28 because of check valve 56. On a downstroke of piston 48, as indicated by arrow 66, fluid will be forced through juncture box 54, past check valve 56 and into manifold 38 where the fluid will be forced past check valves 44 into the respective supply lines 28, but fluid cannot flow back into reservoir 18 because of check valve 60.

Various controls can be used for actuating and deactuating pump means 26 in a periodic or incremental fashion. To that end, an air line 68 leads from air side 52 of piston 48 from cylinder 46 to an air valve 70, the air valve communicating to an appropriate source of air under pressure by a conduit 72. Air valve 70 can be pulsed in a variety of fashions. For instance, a timer may be used for applying lubricating fluid to the lubricating points at timed intervals at all times when the machine is supplied with energy, such as electricity. The air valve may simply be tripped manually. The air valve may be coupled to a microprocessor which could trip the air valve at timed intervals or at intervals based on the number of sheets processed by the machine. To that end, a rotary component 74 may be attached to the air valve and coupled for actuation by the microprocessor. For instance, the microprocessor easily can sense or count the number of sheets being processed by the machine. This is done for other functions, as is known. As an example, the microprocessor could energize the air valve every time 10,000 sheets have been run through the machine.

Each time air valve 70 is pulsed, air under pressure is admitted to cylinder 46 on the air side 52 of piston 48, driving the piston downwardly in the direction of arrow 66. Fluid on the fluid side 50 of the piston then will be forced through juncture box 64, past check valve 56, into manifold 38, past check valves 44, through supply lines 28 and to the respective distributor means 22. Being a pulsation type system, a return spring 76 can be provided to return piston 48 upwardly to draw fluid from reservoir 18 through line 62, past check valve 60, through juncture box 54 and refill cylinder 46 on the fluid side 50 of piston 48, to await the next pulsation.

Figure 3:
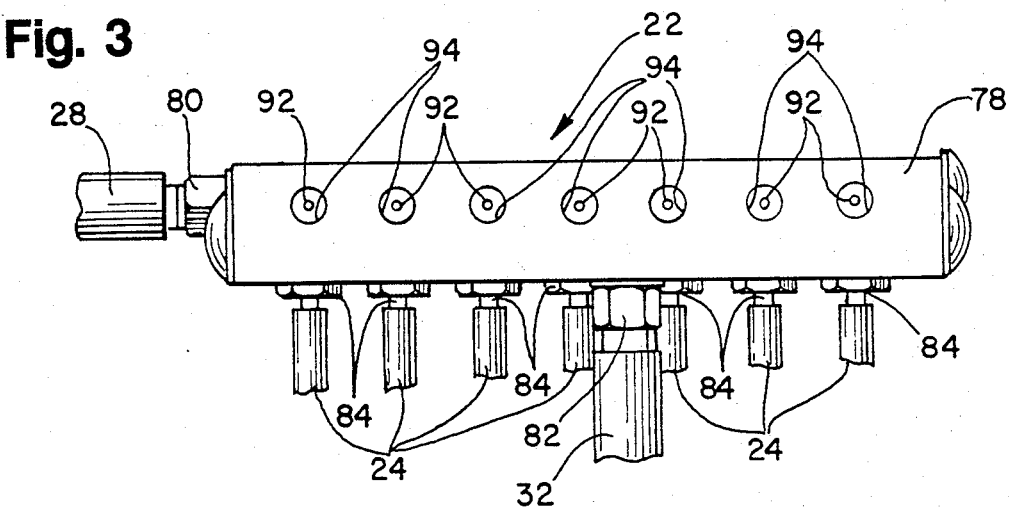
FIG. 3 is a front elevational view of one of the distributor blocks and its associated supply line, overflow line and gravity feed lines.
Figure 4:
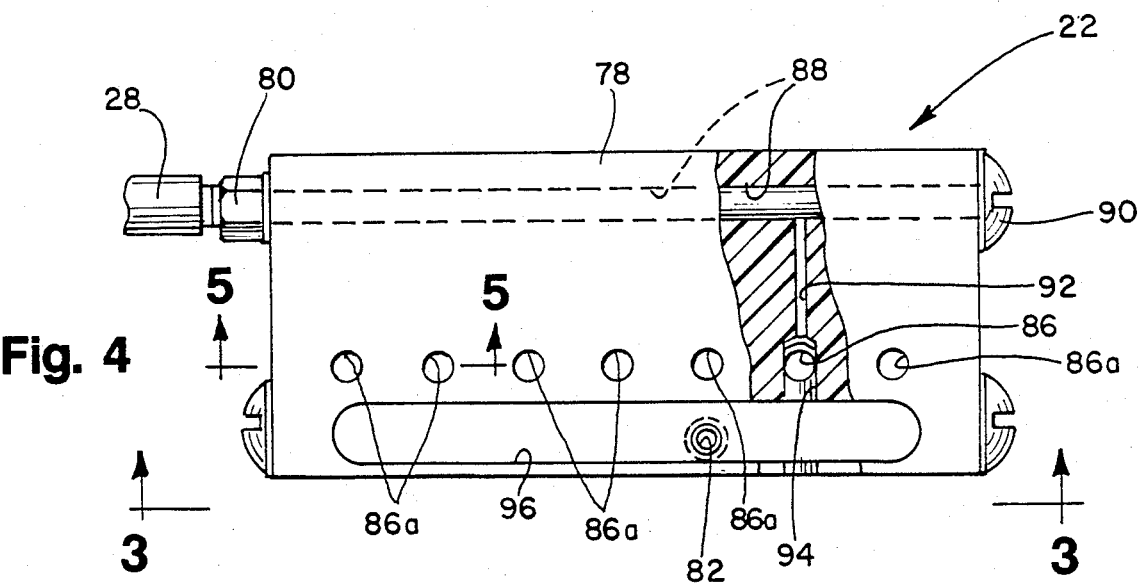
FIG. 4 is a top plan view, partially broken away, of the distributor block of FIG. 3.
Figure 5:
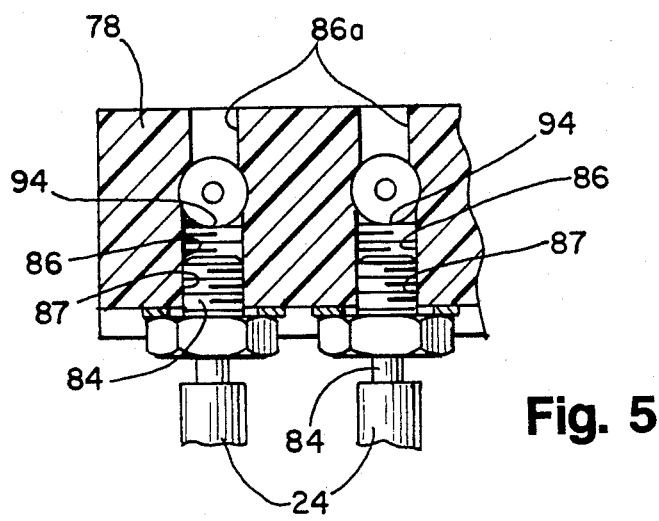
FIG. 5 is a vertical section taken generally along line 5—5 of FIG. 3.

Referring to FIGS. 3-5, each distributor means 22 is illustrated in the form of a block 78 having various passages bored therethrough. One of the supply lines 28 can be seen in FIGS. 3 and 4 connected to block 78 by a fitting 80. One of the overflow lines 32 can be seen in FIG. 3 connected to the bottom of the block by a fitting 82. In addition, a plurality of gravity feed lines 24 can be seen in FIGS. 3 and 5 connected to block 78 by fittings 84, and leading away from the bottom of the block for gravity feeding lubricating fluid to respective lubricating points 16, as described in relation to FIG. 1. A plurality of metering reservoirs 86 (FIG. 5) are bored into block 78 from the top thereof, as at 86a, and, in fact, can be open at the top to gain access thereto should any clogging occur. Fittings 84 are screwed into block 78, as at 87 to communicate gravity feed lines 24 with metering reservoirs 86. The metering reservoirs are sized to determine the amount of lubricating to be delivered to the lubrication points. Gravity feed lines 24 are sized sufficiently small so that the lubricating fluid can be applied to the lubricating points in "droplets" which is a preferred form of lubrication so that the lubricating fluid is slowly "absorbed" by the relatively rotating components of the machine at the lubricating points.

A closed or interior longitudinal, common passage 88 (FIG. 4) extends through distributor block 78, in communication at one end with supply line 28, through fitting 80, and closed at the opposite end, as by a screw plug 90. Small passages 92 lead from common passage 88 individually to a respective one of the metering reservoirs 86. Preferably, passages 92 are sized so that the flow capabilities thereof are substantially equal, and the flow capabilities of all of the passages combined is less than the flow capabilities of supply line 28 and common passage 88. This insures that all metering reservoirs 86 will receive an equal flow of lubricating fluid. Otherwise, one lubricating point on the machine may receive excessive lubrication than another.

Overflow passages 94 (FIG. 4) are bored into distributor block 78, from the front thereof, communicating between metering reservoirs 86 and a collection chamber or trough 96 cut into block 78. The collection chamber can be seen to be in communication with overflow line 32 through fitting 82. The vertical locations of overflow passages 94 (see FIG. 5) are determined depending upon the amount of lubricating fluid that is desired to be applied to the bearing points. In other words, the capacity of the metering reservoirs is determined, in part, by the top of fittings 84, and the bottom of overflow passages 94. With this understanding, the system of the invention actually can be modified to apply more lubricating fluid to one lubricating point than another lubricating point using the same pressures throughout the entire system. All that is required is to vary the vertical location at which an overflow passage 94 communicates with its respective metering reservoir 86. The higher the overflow passage is relative to the bottom of the metering reservoir, the more lubricating fluid the reservoir will hold before overflowing into collection trough 96.

In operation, on each pulsation of air valve 70, lubricating fluid will be forced through supply line 28, as described above, and then into interior or closed common passage 88 in distributor block 78, and from the common passage through small passages 92 into metering reservoirs 86. As the metering reservoirs fill, excess fluid overflows through passages 94 and into collection trough 96 whereupon the fluid will return through overflow line 32 and common line 36 (FIGS. 1 and 2) back into main fluid reservoir 18 or line 62 (FIG. 2). Therefore, a closed system is provided. Because of the overflow feature, the proper amount of lubricating fluid is fed to each lubricating point every cycle or pulsation of the system. Even though the system is powered by pump means 26, the lubricating fluid itself is not fed to the lubricating points under any pressure or force. Rather, because of metering reservoirs 86 and gravity feed lines 24, the lubricating fluid is delivered to the lubricating points slowly and, preferably, with flow capabilities in gravity feed lines 24 effective to deliver droplets to the lubricating points.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed:

1. A system for lubricating a plurality of lubricating points in a printing, duplicating and like machine, comprising:

a main reservoir of lubricating fluid;

distributor means located on the machine above the lubricating points and having a plurality of metering reservoirs sized to determine the amount of lubricant to be delivered to the lubricating points during a given cycle, overflow means from each metering reservoir and a gravity feed line from each metering pump means for pumping lubricating fluid from the main reservoir through appropriate conduit means to the distributor means for filling the metering reservoirs and with excess fluid overflowing therefrom through the overflow means; and cyclical means for periodically actuating and deactuating the pump means.

2. The system of claim 1, including overflow conduit means from said overflow means back to the main reservoir.

3. The system of claim 2 wherein said distributor means include a collection chamber for receiving excess fluid overflowing from all the metering reservoirs, the overflow means communicating with the collection chamber.

4. The system of claim 1 wherein said distributor means include passage means to each metering reservoir and in communication with the conduit means, the flow capabilities of the respective passage means being substantially equal and the flow capability of all the passage means combined being less than the flow capabilities of the conduit means to insure that all metering reservoirs receive an equal flow of lubricating fluid.

5. The system of claim 1 wherein said distributor means include passage means to each metering reservoir and in communication with the conduit means, the flow capabilities of all the passage means combined being less than the flow capabilities of the conduit means to insure that all metering reservoirs receive an equal flow of lubricating fluid.

6. The system of claim 1 wherein said gravity feed lines are sized sufficiently small in relation to the viscosity of the fluid as to deliver fluid to the lubricating points substantially in droplets.

7. The system of claim 1, including a plurality of said distributor means at different locations of different elevations on the machine, separate conduit means between the pump means and each distributor means, and check valve means in each conduit means to prevent a more elevated distributor means from back feeding to a less elevated distributor means.

8. The system of claim 7, including manifold means upstream of said check valve means and communicating all of the conduit means to a single line from the pump means.

9. The system of claim 8, including check valve means in said single line between the manifold means and the pump means.

10. A system for lubricating a plurality of lubricating points in a printing, duplicating and like machine, comprising:

a main reservoir of lubricating fluid;
distributor means located on the machine above the lubricating points and having a plurality of metering reservoirs sized to determine the amount of lubricant to be delivered to the lubricating points during a given cycle, overflow means from each metering reservoir and a gravity feed line from each metering reservoir to a respective one of the lubricating points, the gravity feed lines being sized sufficiently small in relation to the viscosity of the fluid as to deliver fluid to the lubricating points substantially in droplets;
pump means for pumping lubricating fluid from the main reservoir through appropriate conduit means to the distributor means for filling the metering reservoirs and with excess fluid overflowing therefrom through the overflow means;
cyclical means for periodically actuating and deactuating the pump means; and
said distributor means including passage means to each metering reservoir and in communication with the conduit means, the flow capabilities of all the passage means combined being less than the flow capabilities of the conduit means to insure that all metering reservoirs receive an equal flow of lubricating fluid.

11. The system of claim 10, including overflow conduit means from said overflow means back to the main reservoir.

12. The system of claim 11 wherein said distributor means include a collection chamber for receiving excess fluid overflowing from all the metering reservoirs, the overflow means communicating with the collection chamber.

13. The system of claim 10 wherein the flow capabilities of each passage means in said distributor means to each metering reservoir is substantially equal.

14. The system of claim 10, including a plurality of said distributor means at different locations of different elevations on the machine, separate conduit means between the pump means and each distributor means, and check valve means in each conduit means to prevent a more elevated distributor means from back feeding to a less elevated distributor means.

15. The system of claim 14, including manifold means upstream of said check valve means and communicating all of the conduit means to a single line from the pump means.

16. The system of claim 15, including check valve means in said single line between the manifold means and the pump means.

17. A system for lubricating a plurality of lubricating points in a printing, duplicating and like machine, comprising:

a main reservoir of lubricating fluid;
a plurality of distributor means located at different locations of different elevations on the machine above the main reservoir and above the lubricating points, each distributor means having a plurality of metering reservoirs sized to determine the amount of lubricant to the lubricating points during a given cycle, and a gravity feed line from each metering reservoir to a respective one of the lubricating points;
pump means for pumping lubricating fluid from the main reservoir through separate conduit means between the pump means and each distributor means for filling the metering reservoirs;
check valve means in each conduit means to prevent a more elevated distributor means from feeding back to a less elevated distributor means; and
cyclical means for periodically actuating and deactuating the pump means.

18. The system of claim 17, including manifold means upstream of said check valve means and communicating all of the conduit means to a single line from the pump means.

19. The system of claim 18, including check valve means in said single line between the manifold means and the pump means.

* * * * *